Jan. 21, 1969     I. S. WAIT     3,422,763
ROCKET ENGINE IGNITER
Filed Oct. 18, 1965     Sheet _1_ of 2
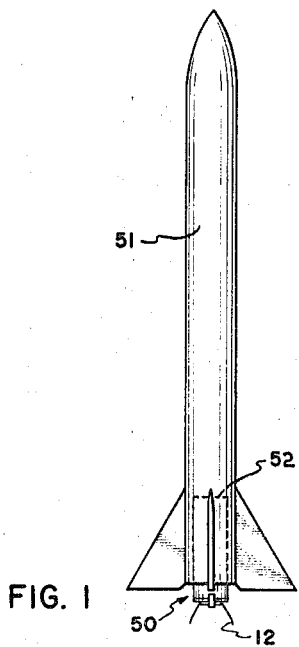
FIG. 1
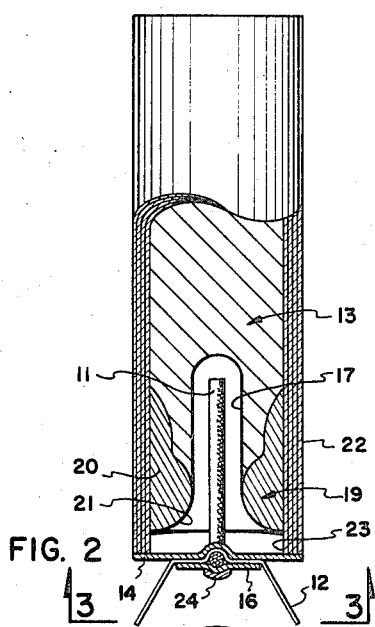
FIG. 2
FIG. 3
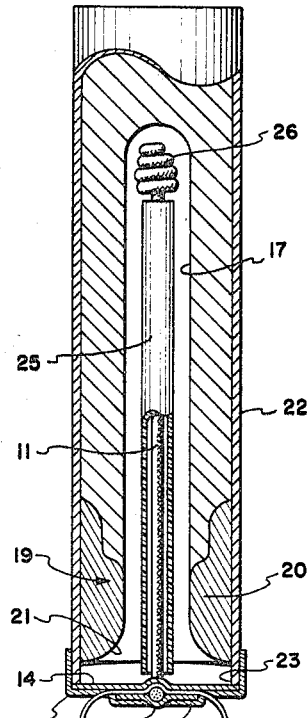
FIG. 4
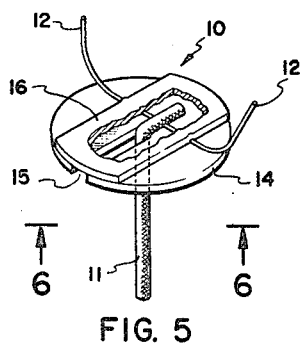
FIG. 5
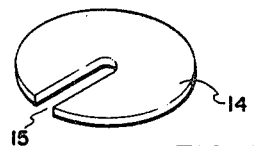
FIG. 6
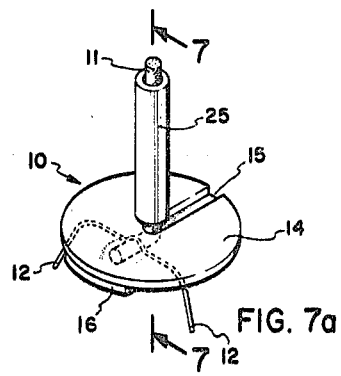
FIG. 7a
FIG. 7
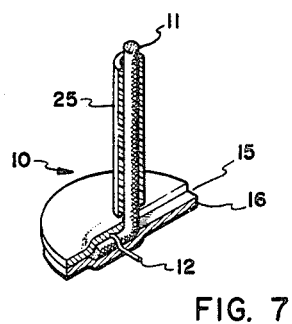
FIG. 8
FIG. 9
INVENTOR.
IRVING S. WAIT
BY Mallinckrodt and Mallinckrodt
ATTORNEYS Jan. 21, 1969  I. S. WAIT  3,422,763

ROCKET ENGINE IGNITER

Filed Oct. 18, 1965  Sheet 2 of 2

INVENTOR.
IRVING S. WAIT
BY Mallinckrodt and Mallinckrodt
ATTORNEYS

United States Patent Office 3,422,763
Patented Jan. 21, 1969

3,422,763
ROCKET ENGINE IGNITER
Irving Stringham Wait, Seymour, Ind., assignor to Rocket Development Corporation, Seymour, Ind., a corporation of Utah
Filed Oct. 18, 1965, Ser. No. 497,172
U.S. Cl. 102—49.7            8 Claims
Int. Cl. F42b 15/10

ABSTRACT OF THE DISCLOSURE

An igniter for rocket engines provides a length of igniter fuse cord for insertion into the perforation of a solid propellant grain. Such length is supported at one end by a disk adapted to close the exhaust end of a rocket engine. An electrical ignition wire is disposed in direct contact with the supported end of the cord, so that, when such wire is connected to a source of electricity, it is heated to a temperature sufficient to ignite the cord, whereby heat of sufficient intensity to ignite the propellant grain is propagated along the length of the perforation thereof. As constructed for model rocket engines, the igniter cord is supported between adherent paper disks which are adapted for adhesive securement across the exhaust end of a rocket motor casing.

Summary of invention

Figure 10:
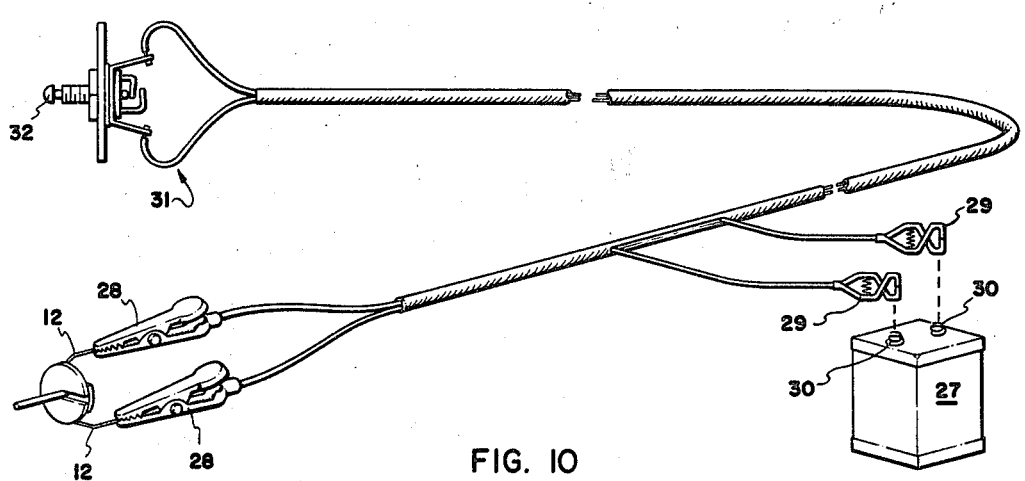

This invention relates to solid propellant rocket engine igniters, particularly those used with small or model rocket engines, but which can be adapted for use with larger engines.

Solid propellant rocket engines commonly utilize an igniter which supplies sufficient heat to initiate propellant combustion. In some instances, however, the igniter fails, either because it does not produce the quantity of heat required in a given time interval, or because it is not positioned properly with respect to the propellant. Even when combustion is initiated, it may not be within a predictable time period.

A known model rocket engine igniter comprises a length of electrically heated wire formed in a loop, which is inserted into the nozzle opening of the engine, and held in position by tissue or wadding. Electric current applied to the wire heats it to a temperature sufficient to ignite the propellant. This igniter has, however, proven unreliable with respect to estimation of ignition time periods, and inefficient because it requires heavy batteries due to the relatively long length of wire required to form the coil. Since it is necessary that all of the engines in a cluster of rockets be ignited at substantially the same instant to obtain maximum initial thrust, the ignition times of the several igniters used must be capable of reliable estimation.

I have now invented an igniter which not only has a predictable and highly reliable ignition time, but which also provides a concentrated heat source that will ignite a propellant substantially uniformly over its entire ignition surface.

A feature of this invention is the provision of an igniter having a relatively short length of electrically heated wire in contact with an igniter cord which ignites and burns when heated. When the igniter is installed on an engine, the igniter cord extends into the perforation of the solid propellant grain providing a sufficient quantity of heat for ignition.

Another feature is the utilization of a disk-shaped support for the electrically heated wire and igniter cord, which support serves the additional function of a temporary nozzle plug.

In some instances, it may be advantageous to provide a tube surrounding part of or the entire length of the igniter cord from the point where it is contacted by the wire. This increases the burning rate of the igniter cord and the quantity of heat generated during any given time period.

It is also a feature of the invention to coil the end or ends of the igniter cord that supply the heat to the propellant grain. This provides a greater quantity of the heat generating igniter cord in close proximity to the propellant and generates an abundance of hot gases that enhances ignition.

There is shown in the accompanying drawings specific embodiments of the invention representing what are presently regarded as the best modes of carrying out the generic concepts in actual practice. From the detailed description of these presently preferred forms of the invention, other more specific objects and features will become apparent.

Figure 11:
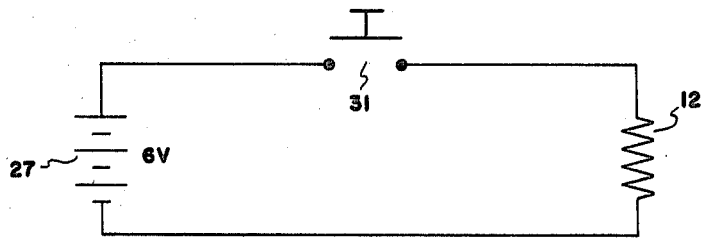
Figure 12:
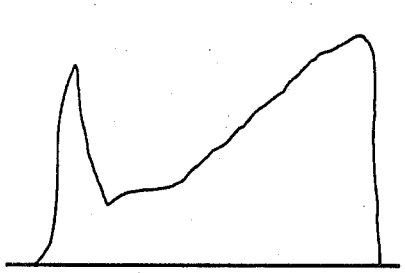
Figure 13:
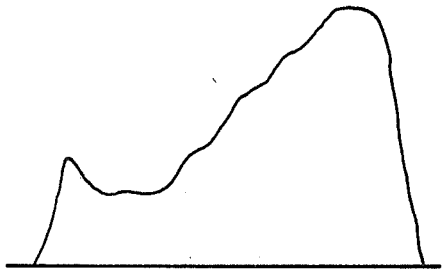

In the drawings:

FIG. 1 is a side elevation of a rocket with the location of a rocket engine shown in dotted lines;

FIG. 2, a side elevation of a rocket engine with a section thereof broken away for convenience of illustration showing the location of an igniter according to this invention installed therein;

FIG. 3, a left hand end elevation of the rocket engine of FIG. 1;

FIG. 4, a cross sectional elevation of a rocket engine of a different type from that shown in FIG. 2, illustrating a variation of the igniter installed therein;

FIG. 5, a top perspective view of an igniter in accordance with this invention, a portion thereof broken away for convenience of illustration;

FIG. 6, a bottom perspective view of the igniter shown in FIG. 5;

FIG. 7 is a cross sectional view taken along line 7—7 of FIG. 7a;

FIG. 7a corresponds to FIG. 6 except for showing a tube surrounding the igniter cord of the igniter;

FIGS. 8 and 9 show perspectives respectively of disks used in constructing the preferred igniter of this invention;

FIG. 10, a schematic showing of the electrical ignition system in accordance with this invention;

FIG. 11, a wiring diagram of the electrical circuitry used in this invention;

FIG. 12, a typical thrust-time curve of a rocket engine using the igniter of this invention as shown in FIG. 7; and FIG. 13, a typical thrust-time curve of a rocket engine using the igniter as shown in FIG. 5.

Referring now to the drawings:

In the illustrated embodiments, the igniter of this invention is arranged so that wire 12, which is capable of being heated by passing electrical current therethrough, is attached to disk shaped support 10 in contact with elongate igniter cord 11. Such igniter cord is bent at a right angle with one end extending in a postion normal to the flat surface of such support. When wire 12 is heated to the ignition temperature of igniter cord 11, the cord ignites and burning is propagated at a rapid but substantially uniform rate along the extended portion of the igniter cord. The heat produced by the burning of cord 11 initiates combustion at the surface of solid propellant grain 13 which is in close proximity to the end of such cord.

To assure ignition of igniter cord 11 by wire 12, they are contacted in overlapping relationship on disk shaped support 10. In order to maintain this relationship, support 10 is preferably comprised of a circular disk 14 provided with an aperture 15 and a disk 16 between which are sandwiched igniter cord 11 and wire 12. The extended leg of igniter cord 11 protrudes through aperture 15 which can be the slot formation as shown or any other suitably configurated opening.

In this manner, the igniter cord 11 can extend into perforation 17 in solid propellant grain 13 when support 10 is installed on rocket engine 18 in the manner shown in FIGS. 2 and 4.

FIG. 1 illustrates the position of the igniter 50 of this invention with respect to a model rocket 51. Rocket engine 52, shown in dotted lines, is located inside the model rocket.

Construction of the igniter of this invention is facilitated by using adhesive coated paper for disks 14 and 16 since all that is required to form the igniter is to press the disks together, sandwiching igniter cord 11 and wire 12. Moreover, the adhesive also serves to seal the area where the cord 11 and wire 12 are in contact providing a miniature pressure vessel. Since igniter cord 11 burns faster at higher pressures, the presence of this pressure vessel enhances ignition and initial burning rate of the cord.

The rocket engines shown in FIGS. 2 and 4 are typical conventional model rocket engines utilizing solid propellant grains 13 having elongate cylindrical perforations 17. They have nozzles 19 having both a constricted throat area 20 and an expansion cone 21. Grains 13 and nozzles 19 are housed in cylindrical casings 22, with the nozzles being inset from the exhaust end of the casings to provide extending rim 23.

Disk shaped support 10 is installed on rim 23, with igniter cord 11 extending into perforation 17. The disk shaped support 10 is lightly adhered to rim 23 by an adhesive (not shown) placed around the edge of disk 14, or by a piece of pressure sensitive adhesive tape 24 placed over the support and extending along the sides of cylindrical casing 22. A two-fold purpose is served by adhesively securing support 10 to the rocket engine in this manner since, not only is igniter cord 11 secured and positioned with respect to the propellant, but the ignition of the propellant is aided as will be hereinafter described.

It is common knowledge that most solid propellants burn faster and ignite better as pressure is increased. This principle is used with the igniter of the present invention, since, because the disk is lightly adhered to rim 23, a momentary pressure build-up in perforation 17 occurs due to the flame and hot gases generated by the burning of fuse 11. As the propellant ignites and the pressure continues to build-up in the perforation, the support 10 is blown off the end of the rocket engine, thereby allowing combustion material in the engine to be exhausted through nozzle 19.

An important feature of this invention is the provision of a tube 25 surrounding the end of igniter cord 11 extending from support base 13 as illustrated in FIGS. 7 and 7a. In the embodiment shown in those figures, the igniters are identical in all respects to the igniter shown in FIG. 5, with the addition of tube 25. Because the burning rate of igniter cord 11 increases with pressure, the presence of tube 25 results in a higher pressure around cord 11 while it is burning and thus increases its burning rate. Since the burning rate of the cord 11 can be increased by these means to be almost instantaneous, a high concentration of heat in the form of hot gases and flame is produced at the moment of ignition, and the propellant grain is more evenly ignited.

The tubing 25 can be any material that can be conveniently installed over igniter cord 11 without an interference fit and which will not rupture due to pressure exerted on it by the combustion products of the fuse. A suitable tubing for this purpose has been found to be electrical insulation tubing, referred to as "spaghetti" tubing.

For providing an even larger quantity of hot gases and flame to ignite propellant grain 13, the end of igniter cord 11 which extends into perforation 17 can be formed into a tight coil 26 as illustrated in FIG. 4. This coil produces a large mass of fuse material, which, when ignited by the flame propagating along igniter cord 11, produces a great quantity of hot gas and flame which moves down the length of grain perforation 17, FIG. 4, and evenly ignites its surface.

With the embodiment of the igniter of this invention as shown in FIG. 4, and previously described, it will be apparent that the igniter has a combined advantage attributable to the various features of this invention embodied therein. These advantages, in order of occurrence in the sequence of ignition are: rapid ignition of igniter cord 11 by electrically heater wire 12 in contact therewith, enhanced by the miniature pressure vessel formed by disks 14 and 16; rapid transmission of the flame front by high pressure burning along the length of igniter cord 11 due to tube 25; release of a large quantity of hot gases from the burning of coiled portion 26 of the igniter cord, causing a pressure build-up in grain perforation 17 which enhances ignition of the propellant and subsequently blows igniter support 10 from the end of the nozzle; and even and complete ignition of the entire exposed surface of perforation 17, caused by the hot gases and flame rushing over the entire propellant surface when the pressure due to the presence of igniter support 10 is released.

The following comparative tests illustrate the advantage obtained by using a tube 25 around igniter cord 11, as shown in FIGS. 7 and 7a:

Two twenty-pound thrust model rocket engines of the type shown in FIG. 4 were ignited, using the igniters shown in FIGS. 5 and 7, respectively, and the respective thrusts were measured by a standard static testing device. The model rocket engine of FIG. 7, equipped with a tube 25 around igniter cord 11, produced a thrust-time curve substantially as shown in FIG. 12, while the engine using the igniter of FIG. 5, not so equipped, produced a thrust-time curve substantially as shown in FIG. 13. Comparison of the two curves clearly shows that the first engine produced a greater initial thrust than the second engine.

Wire 12 can be any type that can be heated by an electric current to a temperature high enough to ignite cord 11 with which it is in contact. The presently preferred material for this purpose is a standard nichrome wire, that can be heated by attaching it to battery 27. Because wire 12 can be relatively short, a standard six volt lantern battery can be used. In a typical attachment arrangement, the ends of wire 12 are attached to electrical connector clamps 28, FIG. 10. The circuit is completed by attaching clamps 29 to terminals 30 of battery 27. Switch 31 normally provides an open break in the circuit, but when button 32 is depressed it completes the circuit, permitting electric current to flow through electrically heated wire 12, which ignites cord 11.

Igniter cord 11 can be any of the presently available igniter cords or fuses that are capable of generating sufficient heat to ignite the particular propellant in the engine in which they are used, and that can be ignited by an electrically heated wire 12. The presently preferred igniter cord is manufactured under the trade name "Thermalite Ignitocord, Type A," by Canadian Safety Fuse Co. Ltd., Brownsberg, Quebec, Canada. Other materials for igniter cord 11, which have been found useful in the invention, are "Jetex" wick, manufactured by Imperial Chemical Industries Ltd., England, and "Thermalite Ignitocord, Type B" made by Canadian Safety Fuse Co. Ltd.

Whereas there is here illustrated and specifically described certain preferred constructions that are presently regarded as being representative of the best mode of carrying out the invention, it should be understood that various changes may be made and other constructions adopted without departing from the inventive subject matter particularly pointed out and claimed herebelow.

I claim:

1. An igniter for a solid propellant rocket engine, comprising in combination:
   an igniter cord bent at substantially right angles to the length thereof and having a portion adapted to extend into the perforation of a solid propellant grain for igniting said solid propellant;

electrical resistance heating means in direct contact with the other portion of said igniter cord for igniting said cord by heat;

supporting means holding said heating means and said other portion of the igniter cord in direct contact and adapted for securement to the exhaust end of the rocket engine, so as to close said exhaust end; and supporting means comprising mutually adherent disks of paper or the like between which are sandwiched said other portion of the igniter cord and said heating means in direct contact with each other.

2. A solid propellant rocket engine as recited in claim 1, further comprising pressure sensitive adhesive means securing said support means to said casing.

3. An igniter as recited in claim 1, wherein one of the disks has an aperture therein through which passes the portion of the igniter cord which is adapted to extend into the perforation of a solid propellant grain.

4. An igniter as reicted in claim 3, wherein said aperture is a slot extending from the perimeter of the disk to a point near the center thereof.

5. An igniter as recited in claim 4, wherein the disk opposite the disk having an aperture therein has two parallel chordal sections removed therefrom, the longitudinal center line of the remainder being substantially coincident with the center line of said slot.

6. An igniter as recited in claim 1, further comprising a tube through which extends that portion of the igniter cord which is adapted to extend into the perforation of a solid propellant grain.

7. An igniter as recited in claim 6, wherein said portion of the igniter cord projects beyond the tube, with the projecting end thereof being tightly coiled immediately adjacent the end of said tube.

8. A solid propellant rocket engine, comprising in combination:

a casing having a nozzle including a constriction and an expansion cone;

a solid propellant grain installed in said casing and having a perforation therein opening into said nozzle;

supporting means closing the exit end of said expansion cone;

an igniter cord, mounted on said supporting means, said cord being bent at substantially right angles to the length thereof and having a portion thereof extending into said perforation for igniting said propellant;

electrical resistance heating means in direct contact with the other portion of said igniter cord for igniting said cord by heat;

said supporting means comprising mutually adherent disks of paper or the like between which are sandwiched said other portion of the igniter cord and said heating means in direct contact with each other.

References Cited

UNITED STATES PATENTS

| 784,226 | 3/1905 | Quinn | 102—28 |
|---|---|---|---|
| 855,224 | 5/1907 | Broadwater | 102—28 |
| 1,611,353 | 12/1926 | Le Pinte | 60—256 |
| 2,605,607 | 8/1952 | Hickman | 102—49 |
| 2,974,596 | 3/1961 | Allen | 102—70 |
| 3,062,147 | 11/1962 | Davis et al. | 102—70 |
| 3,110,845 | 11/1963 | Ott | 102—28 |

FOREIGN PATENTS 1,181,494  11/1964  Germany.

BENJAMIN A. BORCHELT, *Primary Examiner.*

VERLIN R. PENDEGRASS, *Assistant Examiner.*

U.S. Cl. X.R.

102—28, 70, 70.2